United States Patent Office 3,333,930
Patented Aug. 1, 1967

3,333,930
PRODUCTION OF URANYL FLUORIDE
Albert Edgar Grant, Widnes, and Lionel Hepworth Brooks, Wrea Green, Preston, England, assignors to United Kingdom Atomic Energy Authority, London, England
No Drawing. Filed Jan. 6, 1965, Ser. No. 423,828
Claims priority, application Great Britain, Mar. 26, 1964, 12,785/64
3 Claims. (Cl. 23—346)

This invention relates to the production of uranyl fluoride from uranium hexafluoride and includes the production of the hydrated form.

The isotopes of uranium are separated on a large scale by gaseous diffusion of the hexafluoride which may then be converted to metal or oxide, as required, by formation of a series of intermediate compounds. One such compound is uranyl fluoride.

The present invention consists in a process for the production of uranyl fluoride powder, the process comprising introducing gaseous uranium hexafluoride into a mixture of liquid hydrogen fluoride and water, the proportions of hydrogen fluoride and water in the mixture being such that substantially all the uranium separates out as a precipitate of uranyl fluoride.

Powder prepared by the process according to the invention is dry whereas uranyl fluoride prepared by solution of uranium hexafluoride in water or dilute acid is known to be a difficult material to isolate and process because of decomposition and corrosion problems due to the presence of excess water.

It has been found that mixtures containing down to 80% hydrogen fluoride by weight yield a satisfactory precipitate. It is considered that lower concentrations could be used provided the process equipment is suitably designed for efficiently mixing the reactants and removing the heat evolved.

The following are examples of preferred ways of carrying the process of the invention into effect:

Example 1

A solution containing 98% HF is circulated through a short packed tower in counter flow to uranium hexafluoride vapour. The contacting may be operated at above or below atmospheric pressure, depending on the temperature of the circulating acid and hexafluoride vapour. The reaction is almost instantaneous and crystals of uranyl fluoride settle out from the acid at the base of the tower. The acid may be separated from the crystals by suitable physical means such as decantation or evaporation, producing a dry fine crystallised powder analysing as $UO_2F_2 \times H_2O$, the amount of hydration depending on the exact conditions used. A typical analysis was U, 71.0%, F, 12.4%, $H_2O$, 4.7%. The strength of the acid is increased to near 100% during the reaction. It is therefore possible to use hydrogen fluoride/water azeotrope with this acid product to provide further supplies of 98% HF and anhydrous hydrogen fluoride as an additional product.

Example 2

An aqueous solution containing 94% HF prepared from anhydrous HF and azetrope (36% HF) is cooled to around 0° C. and contacted in a stirred vessel with uranium hexafluoride vapour. The flows are controlled so that all the hexafluoride is reacted and anhydrous HF is generated. Crystals are immediately deposited and, passing into a settling vessel, settle rapidly. The acid is decanted and the crystals are produced as a fine, dry, free flowing powder, any residual acid vapourising at room temperature.

Example 3

An aqueous solution containing 80% HF is prepared from anhydrous HF and azeotrope. Into this solution maintained at 0° C. is bubbled uranium hexafluoride, the hexafluoride being at 100° C. and dispersed in nitrogen as a carrier gas; the hexafluoride is added at the rate of 1 gm./min. Crystals of uranyl oxyfluoride are precipitated in the cold liquor and when precipitation is complete the supernatant liquor is decanted off and the crystals are allowed to dry in a stream of dry argon.

It is considered that uranyl fluoride prepared under the above conditions may have advantages when subsequent operations involve reacting uranyl fluoride with steam to form uranium trioxide, or with steam and hydrogen in a fluidised bed to form uranium dioxide. In these operations the surface area of the uranyl fluoride plays an important part and uranyl fluoride prepared in accordance with the invention has a relatively high surface area. Thus uranyl fluoride prepared by the process described in Example 2 has been found to have a surface area of 6.1 sq.m./gm. and uranyl fluoride prepared by the process described in Example 3 a surface area of 9.2 sq.m./gm.

We claim:

1. A process for the production of uranyl fluoride powder, the process comprising introducing gaseous uranium hexafluoride into a mixture of liquid hydrogen fluoride and water, the proportions of hydrogen fluoride and water in the mixture being such that substantially all the uranium separates out as a precipitate of uranyl fluoride.

2. A process according to claim 1 wherein the mixture of liquid hydrogen fluoride and water comprises at least 80% hydrogen fluoride.

3. A process according to claim 1 wherein the uranium hexafluoride is introduced in a stream of nitrogen carrier gas.

References Cited

UNITED STATES PATENTS 3,235,327    2/1966    Blundell et al. _____ 23—352 X

L. DEWAYNE RUTLEDGE, Primary Examiner.

S. TRAUB, R. L. GRUDZIECKI, Assistant Examiners.